United States Patent
Alekseev et al.

(10) Patent No.: US 8,452,006 B2
(45) Date of Patent: May 28, 2013

(54) CRYPTOGRAPHIC PROCESSING USING A PROCESSOR

(75) Inventors: Dmitriy Vladimirovich Alekseev, Moscow (RU); Alexei Vladimirovich Galatenko, Moscow (RU); Aleksey Alexandrovich Letunovskiy, Tokarevka (RU); Alexander Markovic, Media, PA (US); Andrey Anatolevich Nikitin, Moscow (RU)

(73) Assignee: LSI Corporation, San Jose, CA (US)

( * ) Notice: Subject to any disclaimer, the term of this patent is extended or adjusted under 35 U.S.C. 154(b) by 168 days.

(21) Appl. No.: 12/900,827

(22) Filed: Oct. 8, 2010

(65) Prior Publication Data

US 2011/0231673 A1    Sep. 22, 2011

(30) Foreign Application Priority Data

Mar. 18, 2010   (RU) ................................ 2010110344

(51) Int. Cl.
    *G06F 21/00*    (2006.01)
(52) U.S. Cl.
    USPC .................. 380/28; 380/29; 380/30; 713/187
(58) Field of Classification Search
    USPC .......................................................... 380/37
    See application file for complete search history.

(56) References Cited

U.S. PATENT DOCUMENTS

| | | | |
|---|---|---|---|
| 2006/0050887 A1* | 3/2006 | Chen .............................. | 380/270 |
| 2010/0278331 A1 | 11/2010 | Walker et al. | |
| 2010/0281260 A1 | 11/2010 | Farrugia et al. | |
| 2011/0202775 A1 | 8/2011 | Crispin et al. | |

OTHER PUBLICATIONS

"Error Analysis and Detection Procedure for a Hardware Implementation of the Advanced Encryption Standard", Bertoni et al., IEEE Transactions on Computers, vol. 52, No. 4, Apr. 2003.*

"Low Cost Concurrent Error Detection for the Advanced Encryption Standard", Wu et al., IEEE, 2004.*

"Media Gateway Solution Based on Freescale's High-Performance Processors," www.freescale.com, Jun. 15, 2007 [retrieved by EPO on Jul. 28, 2010 from the Internet] (4 pages).

Lien, Roar et al., "A 1 Gbit/s Partially Unrolled Architecture of Hash Functions SHA-1 and SHA-512," Springer-Verlag, LNCS 2964, Jan. 30, 2004, pp. 324-338.

(Continued)

*Primary Examiner* — Taghi Arani
*Assistant Examiner* — Mohammad L Rahman
(74) *Attorney, Agent, or Firm* — Mendelsohn, Drucker & Associates, P.C.; Edward J. Meisarosh; Steve Mendelsohn

(57) ABSTRACT

In one embodiment, a cryptography processor compatible with the Advanced Encryption Standard (AES) for encrypting and decrypting has a memory storing each element of an AES State, normally 8-bit long, in a corresponding memory space that is at least 9 bits long. Using the larger memory spaces, the processor performs modified AES transformations on the State. A modified column-mixing transformation uses bit-shifting and XOR operations, thereby avoiding some multiplications and modulo reductions and resulting in some 9-bit State elements. A modified byte-substitution transformation uses a 512-element look-up table to accommodate 9-bit inputs. The modified byte-substitution transformation is combined with a modified row-shifting transformation. The memory has data registers each holding four State elements. A modified expanded key schedule is used in a modified round-key-adding transformation that is combined with the modified column-mixing transformation, wherein all four elements stored in a single data register are processed together in some operations.

23 Claims, 9 Drawing Sheets

OTHER PUBLICATIONS

Grembowski, Tim, et al., "Comparative Analysis of the Hardware Implementations of Hash Functions SHA-1 and SHA-512," Springer-Verlag, LNCS 2433, Sep. 30, 2002, pp. 75-89.

PCT International Search Report dated Aug. 6, 2010 for International Application No. PCT/RU2009/000478 (15 pages).

"Secure Hash Standard," Federal Information Processing Standards Publication 180-2 (FIPS 180-2), National Institute of Standards and Technology (NIST), http://csrc.nist.gov/, Aug. 1, 2002 [retrieved on Jun. 30, 2009]. Retrieved from the Internet: <URL: http://csrc.nist.gov/publications/fips/fips180-2/fips180-2.pdf> (75 pages).

"HMAC: Keyed-Hashing for Message Authentication," Request for Comment (RFC) 2104 of the Internet Engineering Task Force (IETF), www.ietf.org, Feb. 1997 [retrieved on Jul. 14, 2009]. Retrieved from the Internet: <URL: http://www.ietf.org/rfc/rfc2104.txt> (11 pages).

"Advanced Encryption Standard (AES)," Federal Information Processing Standards Publication 197 (FIPS 197), National Institute of Standards and Technology (NIST), http://csrc.nist.gov/, Nov. 26, 2001 [retrieved on Jun. 30, 2009]. Retrieved from the Internet: <URL: http://csrc.nist.gov/publications/fips/fips197/fips-197.pdf> (51 pages).

Dworkin, Morris, "Recommendation for Block Cipher Modes of Operation," NIST Special Publication 800-38A, 2001 Edition, http://csrc.nist.gov, [retrieved on Feb. 4, 2009]. Retrieved from the Internet: <URL: http://csrc.nist.gov/publications/nistpubs/800-38a/sp800-38a.pdf> (66 pages).

\* cited by examiner

*FIG. 2*
PRIOR ART

|   | y |   |   |   |   |   |   |   |   |   |   |   |   |   |   |   |
|---|---|---|---|---|---|---|---|---|---|---|---|---|---|---|---|---|
| x | | 0 | 1 | 2 | 3 | 4 | 5 | 6 | 7 | 8 | 9 | a | b | c | d | e | f |
| | 0 | 63 | 7c | 77 | 7b | f2 | 6b | 6f | c5 | 30 | 01 | 67 | 2b | fe | d7 | ab | 76 |
| | 1 | ca | 82 | c9 | 7d | fa | 59 | 47 | f0 | ad | d4 | a2 | af | 9c | a4 | 72 | c0 |
| | 2 | b7 | fd | 93 | 26 | 36 | 3f | f7 | cc | 34 | a5 | e5 | f1 | 71 | d8 | 31 | 15 |
| | 3 | 04 | c7 | 23 | c3 | 18 | 96 | 05 | 9a | 07 | 12 | 80 | e2 | eb | 27 | b2 | 75 |
| | 4 | 09 | 83 | 2c | 1a | 1b | 6e | 5a | a0 | 52 | 3b | d6 | b3 | 29 | e3 | 2f | 84 |
| | 5 | 53 | d1 | 00 | ed | 20 | fc | b1 | 5b | 6a | cb | be | 39 | 4a | 4c | 58 | cf |
| | 6 | d0 | ef | aa | fb | 43 | 4d | 33 | 85 | 45 | f9 | 02 | 7f | 50 | 3c | 9f | a8 |
| | 7 | 51 | a3 | 40 | 8f | 92 | 9d | 38 | f5 | bc | b6 | da | 21 | 10 | ff | f3 | d2 |
| | 8 | cd | 0c | 13 | ec | 5f | 97 | 44 | 17 | c4 | a7 | 7e | 3d | 64 | 5d | 19 | 73 |
| | 9 | 60 | 81 | 4f | dc | 22 | 2a | 90 | 88 | 46 | ee | b8 | 14 | de | 5e | 0b | db |
| | a | e0 | 32 | 3a | 0a | 49 | 06 | 24 | 5c | c2 | d3 | ac | 62 | 91 | 95 | e4 | 79 |
| | b | e7 | c8 | 37 | 6d | 8d | d5 | 4e | a9 | 6c | 56 | f4 | ea | 65 | 7a | ae | 08 |
| | c | ba | 78 | 25 | 2e | 1c | a6 | b4 | c6 | e8 | dd | 74 | 1f | 4b | bd | 8b | 8a |
| | d | 70 | 3e | b5 | 66 | 48 | 03 | f6 | 0e | 61 | 35 | 57 | b9 | 86 | c1 | 1d | 9e |
| | e | e1 | f8 | 98 | 11 | 69 | d9 | 8e | 94 | 9b | 1e | 87 | e9 | ce | 55 | 28 | df |
| | f | 8c | a1 | 89 | 0d | bf | e6 | 42 | 68 | 41 | 99 | 2d | 0f | b0 | 54 | bb | 16 |

| | | y | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | a | b | c | d | e | f |
| x | 00 | 63 | 7c | 77 | 7b | f2 | 6b | 6f | c5 | 30 | 01 | 67 | 2b | fe | d7 | ab | 76 |
| | 01 | ca | 82 | c9 | 7d | fa | 59 | 47 | f0 | ad | d4 | a2 | af | 9c | a4 | 72 | c0 |
| | 02 | b7 | fd | 93 | 26 | 36 | 3f | f7 | cc | 34 | a5 | e5 | f1 | 71 | d8 | 31 | 15 |
| | 03 | 04 | c7 | 23 | c3 | 18 | 96 | 05 | 9a | 07 | 12 | 80 | e2 | eb | 27 | b2 | 75 |
| | 04 | 09 | 83 | 2c | 1a | 1b | 6e | 5a | a0 | 52 | 3b | d6 | b3 | 29 | e3 | 2f | 84 |
| | 05 | 53 | d1 | 00 | ed | 20 | fc | b1 | 5b | 6a | cb | be | 39 | 4a | 4c | 58 | cf |
| | 06 | d0 | ef | aa | fb | 43 | 4d | 33 | 85 | 45 | f9 | 02 | 7f | 50 | 3c | 9f | a8 |
| | 07 | 51 | a3 | 40 | 8f | 92 | 9d | 38 | f5 | bc | b6 | da | 21 | 10 | ff | f3 | d2 |
| | 08 | cd | 0c | 13 | ec | 5f | 97 | 44 | 17 | c4 | a7 | 7e | 3d | 64 | 5d | 19 | 73 |
| | 09 | 60 | 81 | 4f | dc | 22 | 2a | 90 | 88 | 46 | ee | b8 | 14 | de | 5e | 0b | db |
| | 0a | e0 | 32 | 3a | 0a | 49 | 06 | 24 | 5c | c2 | d3 | ac | 62 | 91 | 95 | e4 | 79 |
| | 0b | e7 | c8 | 37 | 6d | 8d | d5 | 4e | a9 | 6c | 56 | f4 | ea | 65 | 7a | ae | 08 |
| | 0c | ba | 78 | 25 | 2e | 1c | a6 | b4 | c6 | e8 | dd | 74 | 1f | 4b | bd | 8b | 8a |
| | 0d | 70 | 3e | b5 | 66 | 48 | 03 | f6 | 0e | 61 | 35 | 57 | b9 | 86 | c1 | 1d | 9e |
| | 0e | e1 | f8 | 98 | 11 | 69 | d9 | 8e | 94 | 9b | 1e | 87 | e9 | ce | 55 | 28 | df |
| | 0f | 8c | a1 | 89 | 0d | bf | e6 | 42 | 68 | 41 | 99 | 2d | 0f | b0 | 54 | bb | 16 |
| | 10 | af | a2 | d4 | ad | c0 | 72 | a4 | 9c | 7d | c9 | 82 | ca | f0 | 47 | 59 | fa |
| | 11 | 2b | 67 | 01 | 30 | 76 | ab | d7 | fe | 7b | 77 | 7c | 63 | c5 | 6f | 6b | f2 |
| | 12 | e2 | 80 | 12 | 07 | 75 | b2 | 27 | eb | c3 | 23 | c7 | 04 | 9a | 05 | 96 | 18 |
| | 13 | f1 | e5 | a5 | 34 | 15 | 31 | d8 | 71 | 26 | 93 | fd | b7 | cc | f7 | 3f | 36 |
| | 14 | 39 | be | cb | 6a | cf | 58 | 4c | 4a | ed | 00 | d1 | 53 | 5b | b1 | fc | 20 |
| | 15 | b3 | d6 | 3b | 52 | 84 | 2f | e3 | 29 | 1a | 2c | 83 | 09 | a0 | 5a | 6e | 1b |
| | 16 | 21 | da | b6 | bc | d2 | f3 | ff | 10 | 8f | 40 | a3 | 51 | f5 | 38 | 9d | 92 |
| | 17 | 7f | 02 | f9 | 45 | a8 | 9f | 3c | 50 | fb | aa | ef | d0 | 85 | 33 | 4d | 43 |
| | 18 | 14 | b8 | ee | 46 | db | 0b | 5e | de | dc | 4f | 81 | 60 | 88 | 90 | 2a | 22 |
| | 19 | 3d | 7e | a7 | c4 | 73 | 19 | 5d | 64 | ec | 13 | 0c | cd | 17 | 44 | 97 | 5f |
| | 1a | ea | f4 | 56 | 6c | 08 | ae | 7a | 65 | 6d | 37 | c8 | e7 | a9 | 4e | d5 | 8d |
| | 1b | 62 | ac | d3 | c2 | 79 | e4 | 95 | 91 | 0a | 3a | 32 | e0 | 5c | 24 | 06 | 49 |
| | 1c | b9 | 57 | 35 | 61 | 9e | 1d | c1 | 86 | 66 | b5 | 3e | 70 | 0e | f6 | 03 | 48 |
| | 1d | 1f | 74 | dd | e8 | 8a | 8b | bd | 4b | 2e | 25 | 78 | ba | c6 | b4 | a6 | 1c |
| | 1e | 0f | 2d | 99 | 41 | 16 | bb | 54 | b0 | 0d | 89 | a1 | 8c | 68 | 42 | e6 | bf |
| | 1f | e9 | 87 | 1e | 9b | df | 28 | 55 | ce | 11 | 98 | f8 | e1 | 94 | 8e | d9 | 69 |

700

801

| ROUND | BYTES USED |
|---|---|
| 0 | 0-15 |
| 1 | 16-39 AND 248-255 |
| 2 | 40-63 AND 256-263 |
| 3 | 64-87 AND 264-271 |
| 4 | 88-111 AND 272-279 |
| 5 | 112-135 AND 280-287 |
| 6 | 136-159 AND 288-295 |
| 7 | 160-183 AND 296-303 |
| 8 | 184-207 AND 304-311 |
| 9 | 208-231 AND 312-319 |
| 10 | 232-247 |

FIG. 11
1101

| m | CURRENT STATE | NEXT STATE |
|---|---|---|
| 1 | $s_{0,0}$ | $s_{0,0}$ |
| 2 | $s_{0,1}$ | $s_{0,1}$ |
| 3 | $s_{0,2}$ | $s_{0,2}$ |
| 4 | $s_{1,0}$ | $s_{1,3}$ |
| 5 | $s_{0,3}$ | $s_{0,3}$ |
| 6 | $s_{1,1}$ | $s_{1,0}$ |
| 7 | $s_{1,2}$ | $s_{1,1}$ |
| 8 | $s_{1,3}$ | $s_{1,2}$ |
| 9 | $s_{2,2}$ | $s_{2,0}$ |
| 10 | $s_{2,0}$ | $s_{2,2}$ |
| 11 | $s_{2,3}$ | $s_{2,1}$ |
| 12 | $s_{2,1}$ | $s_{2,3}$ |
| 13 | $s_{3,1}$ | $s_{3,2}$ |
| 14 | $s_{3,0}$ | $s_{3,1}$ |
| 15 | $s_{3,3}$ | $s_{3,0}$ |
| 16 | $s_{3,2}$ | $s_{3,3}$ |

FIG. 10
1001

| ALU OPERATIONS | | AGU OPERATIONS | |
|---|---|---|---|
| E1 | | | |
| E2 | C1 | | |
| E3 | C2 | | |
| E4 | C3 | U1 | |
| E5 | C4 | U2 | |
| E6 | C5 | U3 | |
| E7 | C6 | U4 | |
| E8 | C7 | I1 | U5 | R1 |
| E9 | C8 | I2 | U6 | R2 |
| E10 | C9 | I3 | U7 | R3 |
| E11 | C10 | I4 | U8 | R4 |
| E12 | C11 | I5 | U9 | R5 |
| E13 | C12 | I6 | U10 | R6 |
| E14 | C13 | I7 | U11 | R7 |
| E15 | C14 | I8 | U12 | R8 |
| E16 | C15 | I9 | U13 | R9 |
| | C16 | I10 | U14 | R10 |
| | | I11 | U15 | R11 |
| | | I12 | U16 | R12 |
| | | I13 | | R13 |
| | | I14 | | R14 |
| | | I15 | | R15 |
| | | I16 | | R16 |

FIG. 12
1201

| ALU OPERATIONS | | AGU OPERATIONS | |
|---|---|---|---|
| E2 | C1 | | |
| E3 | C2 | | |
| E4 | C3 | U1 | |
| E5 | C4 | U2 | |
| E6 | C5 | U3 | |
| E7 | C6 | U4 | |
| E8 | C7 | U5 | R1 |
| E9 | C8 | U6 | R2 |
| E10 | C9 | U7 | R3 |
| E11 | C10 | U8 | R4 |
| E12 | C11 | U9 | R5 |
| E13 | C12 | U10 | R6 |
| E14 | C13 | U11 | R7 |
| E15 | C14 | U12 | R8 |
| E16 | C15 | U13 | R9 |
| | C16 | U14 | R10 |
| | | U15 | R11 |
| | I11 | U16 | R12 |
| | I12 | | R13 |
| | I13 | | R14 |
| | I14 | | R15 |
| | I15 | | R16 |
| E1 | I16 | | |

FIG. 13
1301

| ALU OPERATIONS | | AGU OPERATIONS | |
|---|---|---|---|
| E3 | C2 | U1 | RK1 |
| E4 | C3 | RK2 | RK3 |
| E6 | C4 | U2 | RK4 |
| E7 | C5 | U3 | |
| C1 | C6 | U4 | |
| E8 | C7 | U5 | R1+I1 |
| E9 | C8 | U6 | R2 |
| E12 | C9 | I2 | U7 | R3 |
| E11 | C10 | I3 | U8 | R4 |
| E16 | C11 | I4 | U9 | R5 |
| E13 | C12 | I5 | U10 | R6 |
| E14 | C13 | I6 | U11 | R7 |
| | C14 | I7 | U12 | R8 |
| | C15 | I8 | U13 | R9+I9 |
| | C16 | | U14 | R10 |
| | | I10 | U15 | R11 |
| | | I11 | U16 | R12 |
| | | I12 | RK5 | R13 |
| | CK6 | I13 | | R14 |
| E1 | | I14 | | R15 |
| E2 | | I15 | | R16 |
| | | I16 | | |

CRYPTOGRAPHIC PROCESSING USING A PROCESSOR

BACKGROUND OF THE INVENTION

1. Field of the Invention

The current invention relates to cryptographic-processing functions, and in particular, to encryption and decryption using a processor.

2. Description of the Related Art

Encryption and decryption are cryptographic processes that convert plaintext into ciphertext and vice-versa, respectively. Plaintext refers to text-based data (i.e., a sequence of bit strings) that is typically readily readable by and comprehensible to a human. Note that, more generally, plaintext refers to the input to an encryption algorithm, and the plaintext may well be gibberish. Data encryption is a process used to convert plaintext into ciphertext, where ciphertext typically appears to be gibberish not readily readable by or comprehensible to a human. Note that, more generally, ciphertext refers to the output of an encryption algorithm, and the ciphertext might happen to resemble recognizable text. A typical flow of information in cryptography involves inputting original plaintext into an encryption algorithm that outputs ciphertext, transmitting the ciphertext, and then inputting the ciphertext into a complementary decryption algorithm that outputs the original plaintext.

One way to encrypt plaintext involves using a key. The resulting ciphertext is then decrypted using the appropriate corresponding key. A cryptographic system that uses the same key for both encryption and decryption is known as a symmetric cryptographic system. A collection of functions and their inverses that use keys and map strings of a fixed length to strings of the same length is known as a block cipher. One popular symmetric block cipher is the Advanced Encryption Standard (AES), described in Federal Information Processing Standards (FIPS) Publication 197, incorporated herein by reference in its entirety. Older FIPS-approved symmetric block ciphers include the Data Encryption Standard (DES) and triple-DES.

Symmetric block ciphers are used in multiple endeavors and for multiple purposes. One common use for symmetric block ciphers is for the cryptographic protection of transmitted data. AES may be used to encrypt and decrypt secure real-time protocol (SRTP) packets. SRTP is a secure version of RTP, where RTP is a protocol for delivering media content over a packet-switched network, such as the Internet. SRTP provides security, integrity, and authentication for RTP packets.

The AES algorithm, as currently defined, processes data in block sizes of 128 bits. Data block size is represented by Nb, where Nb is the number of 32-bit words in a block. Thus, for 128-bit blocks, Nb=4. The length of the cipher key used is represented by Nk, where Nk is the number of 32-bit words in the cipher key. The AES standard, as currently defined, allows use of cipher keys with lengths of 128 bits (wherein Nk=4), 192 bits (Nk=6), or 256 bits (Nk=8). A particular implementation of the AES standard should support at least one of the standard cipher-key lengths. A block of input data is transformed over a series of rounds, where the number of rounds, represented by Nr, is dependent on the length of the cipher key. There are 10 rounds when using 128-bit keys, 12 when using 192-bit keys, and 14 when using 256-bit keys. The AES standard recognizes that, in the future, the specific values for key length, block size, and number of rounds are subject to change.

The working data block, or intermediate cipher result, of AES encryption and decryption is known as the State, and can be represented as a rectangular array of bytes having four rows and four columns of 8-bit bytes (for a total of 128 bits). The bytes can be viewed as finite-field elements. They can be added and multiplied, but those operations are different from those used for numbers. For example, both addition and its inverse are implemented by performing an exclusive-OR (XOR) operation, while multiplication involves modulo reduction. Unless otherwise noted, references herein to addition mean the performance of an XOR operation. Encryption and decryption start with the copying of an input block of data into the State array, where the bytes of the State will be transformed over the requisite number of rounds, and then the State's final value will be provided as the corresponding output block. It should be noted that, depending on the particular AES mode of operation used, (1) the input data block may consist of data other than the corresponding plaintext or ciphertext block and (2) the output block may undergo additional transformations before resulting in the corresponding ciphertext or plaintext block.

FIG. 1 illustrates the transformation of input block 101 via State 102 into output block 103. 128-bit input block 101 comprises sixteen bytes, $in_0, \ldots in_{15}$, arranged into an array of four rows and four columns. State 102, also comprising four rows and four columns of bytes, $s_{0,0}, \ldots s_{3,3}$, is initialized to equal input block 101, where $s_{i,j}=in_{[i+4j]}$, with i and j representing row and column, respectively. Thus, the bytes the input block sequentially fill up the columns of State 102. State 102 is then modified over a number of rounds, after which State 102 is output to output block 103, which comprises sixteen bytes, $out_0, \ldots out_{15}$, where $out_{[i+4j]}=s_{i,j}$. Thus, output block 103 equals a sequential emptying of the columns of State 102.

The AES algorithm takes the cipher key, and performs a key expansion routine to generate a key schedule with a total of Nb(Nr+1) 32-bit (or 4-byte) words, which are used for both encryption and decryption. Each round of encryption or decryption uses a different set of Nb words from the key schedule. The first Nk words, equivalent to one cipher key length, of the expanded key schedule are filled with the cipher key. Every subsequent word of the key schedule is based on one or more of the previous words of the key schedule and zero or more constants.

For both its encryption and decryption, the AES algorithm uses a round function that is composed of four different byte-oriented transformations: (1) byte substitution using a substitution table (S-box), (2) shifting rows of the State array by different offsets, (3) mixing the data within each column of the State array, and (4) adding a round key to the State. Encryption starts with an initial stage in which an initial round key is added to the State. This initial stage is sometimes referred to as round zero. The initial stage is then followed by Nr rounds of transformations. The first Nr−1 rounds include the above four transformations, represented as SubBytes( ), ShiftRows( ), MixColumns( ), and AddRoundKey( ), respectively. Note that the final round of block encryption, i.e., round Nr, does not include the MixColumns( ) transformation. Also note that, although some descriptions of the AES standard state that the above-described transformations are not performed in the preliminary round (i.e., round zero), the addition of the round key in round zero is equivalent to performing the AddRoundKey( ) transformation.

FIG. 2 shows S-box 201 used for the SubBytes( ) transformation. Row {x} and column {y} of S-box 201 represent input 8-bit hexadecimal number {xy}, where the byte at the intersection of row {x} and column {y} represents the substitution output for {xy}. Thus, for example, an input of {a2} would result in an output of {3a}, which is the number at the intersection of row {a} and column {2}. As can be seen, SubBytes( ) substitutes one byte for another.

FIG. 3 shows the ShiftRows( ) transformation of State 301 into State 302. The ShiftRows( ) transformation performs a cyclic shift of row k by k positions to the left, where k=0 to 3. Thus, the first row (i.e., k=0) is not shifted, the second row is cyclically shifted one byte to the left, the third row is cyclically shifted two bytes to the left, and the fourth row is cyclically shifted three bytes to the left.

Next, the MixColumns( ) transformation operates on each of the four columns of the State in turn. The MixColumns( ) transformation involves multiplying modulo $x^4+1$ each column, s(x), treated as a four-term polynomial over $GF(2^8)$, with the fixed polynomial $a(x)=\{03\}x^3+\{01\}x^2+\{01\}x+\{02\}$. The multiplication of column i can also be represented as a vector product of the old column s(x) with matrix a(x) representing the fixed polynomial, resulting in new columns sn(x), i.e., $sn(x)=a(x) \otimes s(x)$, where $\otimes$ represents multiplication modulo $x^4+1$.

FIG. 4 shows the MixColumns( ) transformation for column j as the product of column j, shown as input vector 401, with matrix 402, representing the fixed polynomial, resulting in new column j, shown as output vector 403. The four elements of input vector 401 are $s_{0,j}, \ldots, s_{3,j}$ and the corresponding four elements of output vector 403 are $sn_{0,j}, \ldots sn_{3,j}$. The elements of the resultant column product can be represented by the series of equations below, where $\oplus$ represents the exclusive-OR (XOR) operation and · represents finite-field polynomial multiplication in $GF(2^8)$ modulo $x^8+x^4+x^3+x+1$:

$$sn_{0,j}=(\{02\}\cdot s_{0,j})\oplus(\{03\}\cdot s_{1,j})\oplus s_{2,j}\oplus s_{3,j} \quad (1.1)$$

$$sn_{1,j}=s_{0,j}\oplus(\{02\}\cdot s_{1,j})\oplus(\{03\}\cdot s_{2,j})\oplus s_{3,j} \quad (1.2)$$

$$sn_{2,j}=s_{0,j}\oplus s_{1,j}\oplus(\{02\}\cdot s_{2,j})\oplus(\{03\}\cdot s_{3,j}) \quad (1.3)$$

$$sn_{3,j}=(\{03\}\cdot s_{0,j})\oplus s_{1,j}\oplus s_{2,j}\oplus(\{02\}\cdot s_{3,j}) \quad (1.4)$$

Following the MixColumns( ) transformation of all four columns, an AddRoundKey( ) transformation is performed where a 128-bit (or 16-byte) round key, from the expanded key schedule, is added (using a XOR operation) to the State column by column. The AddRoundKey( ) transformation can be represented by Equation (2) below, where $sn_{i,j}$ represents elements of the transformed State, $s_{i,j}$ represents elements of the pre-transformation State, $w_x$ represents a 4-byte segment of the expanded key schedule starting at byte x, and r represents the round number, where $0 \leq r \leq Nr$.

$$[sn_{0,j},sn_{1,j},sn_{2,j},sn_{3,j}]=[s_{0,j},s_{1,j},s_{2,j},s_{3,j}]\oplus[w_{r*Nb+j}] \quad (2)$$

After the final round, the State, containing encrypted data (i.e., ciphertext), is copied to output 103 of FIG. 1.

Straightforward AES decryption uses the inverse transformations of the encryption transformations. The decryption algorithm involves the following sequence of transformations: (1) InvShiftRows( ), (2) InvSubBytes( ), (3) AddRoundKey( ) (since XOR is its own inverse), and (4) InvMixColumns( ). Like encryption, decryption proceeds over an initial stage followed by Nr rounds using the same Nr+1 round keys used for encryption; however, the round keys are used in reverse order, starting with the final round key of the key schedule, stepping backwards through the expanded key schedule, and ending with the initial round key. The expanded key schedule is created in the same way as in the encryption process. Decryption starts with the copying of a block of encrypted data (i.e., ciphertext) to the State and the addition of the final round key of the key schedule to the State. This is followed by Nr−1 identical rounds of transformation, which include the above four inverse transformations, and wherein the AddRoundKey( ) transformation steps backwards through the key schedule. The final round (round Nr) does not include the InvMixColumns( ) transformation.

The AES standard also provides an equivalent decryption process that allows a reordering of the inverse procedures based on commutative and distributive properties of combinations of the procedures, and which is particularly beneficial for systems that perform both encryption and decryption. The equivalent decryption process requires the transformation of the round keys for rounds 1 to Nr−1 using an InvMixColumns( ) procedure, which can be accomplished by using the expanded key schedule and transforming the appropriate round keys therein. The equivalent decryption process starts with the addition of the final round key, i.e., the last Nb words of the key expansion schedule, followed by Nr−1 identical rounds of InvSubBytes( ), InvShiftRows( ), InvMixColumns( ), and AddRoundKey( ) transformations, respectively, stepping backwards through the key expansion schedule. The final round does not include the InvMixColumns( ) transformation for the State. After the final round, the content of the State is copied to the output.

It should be noted that several AES modes of operations such as, for example, cipher feedback mode (CFM) and output feedback mode (OFM), described in NIST Special Publication 800-38A, incorporated herein by reference in its entirety, both encryption and decryption use only the forward cipher function. In other words, (1) both encryption and decryption processing utilize the ShiftRows( ), SubBytes( ), MixColumns( ), and AddRoundKey( ) transformations and (2) neither needs to utilize the InvSubBytes( ), InvShiftRows( ), and InvMixColumns transformations.

Modifications of the methodologies described in the AES standard may provide for more-efficient encryption and decryption algorithms. In addition, adjusting the methodologies to take advantage of particular processor architectures may also provide for more-efficient encryption and decryption.

SUMMARY OF THE INVENTION

One embodiment of the invention can be a cryptography processor comprising one or more arithmetic logic units (ALUs) and a plurality of data registers. The processor is adapted to (a) receive an a-bit-long block of data, wherein the block of data is organized as a/n n-bit words, (b) store the a/n n-bit words as a state in the data registers, wherein the state is a matrix having b>1 rows and c>1 columns of p-bit state elements, wherein p>n, a/n>1, each n-bit word of data is stored in a corresponding p-bit state element, and b*c*n=a, and (c) perform a column-mixing transformation on the state using the one or more ALUs, wherein the column-mixing transformation involves generating finite-field products using bit-shifting and XOR operations.

Another embodiment of the invention can be a method for a cryptography processor comprising one or more arithmetic logic units (ALUs) and a plurality of data registers. The method comprises (a) receiving an a-bit-long block of data, wherein the block of data is organized as a/n n-bit words, (b) storing the a/n n-bit words as a state in the data registers, wherein the state is a matrix having b>1 rows and c>1 columns of p-bit state elements, wherein p>n, a/n>1, each n-bit word of data is stored in a corresponding p-bit state element, and b*c*n=a, and (c) performing a column-mixing transformation on the state using the one or more ALUs, wherein the column-mixing transformation involves generating finite-field products using bit-shifting and XOR operations.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 2 shows a substitution box used for the SubBytes( ) transformation, in accordance with the AES standard.

FIG. 5 shows a 512-unit S-box, which is used to implement the ModSubBytes( ) function in accordance with one embodiment of the present invention.

FIG. 10 shows a table representing operations performed in one implementation by ALUs and AGUs of the processing device of FIG. 9 for one AES round.

FIG. 11 shows a table representing, for each m of the table of FIG. 10, which element of the current State corresponds to m, and into which element of the next State the calculated result of the operations for the round is inserted.

FIG. 12 shows a table representing operations performed by ALUs and AGUs in a second implementation of the processing device of FIG. 9 for one AES round.

FIG. 13 shows a table representing operations performed by ALUs and AGUs in a third implementation of the processing device of FIG. 9 for one AES round.

DETAILED DESCRIPTION

Figure 1:
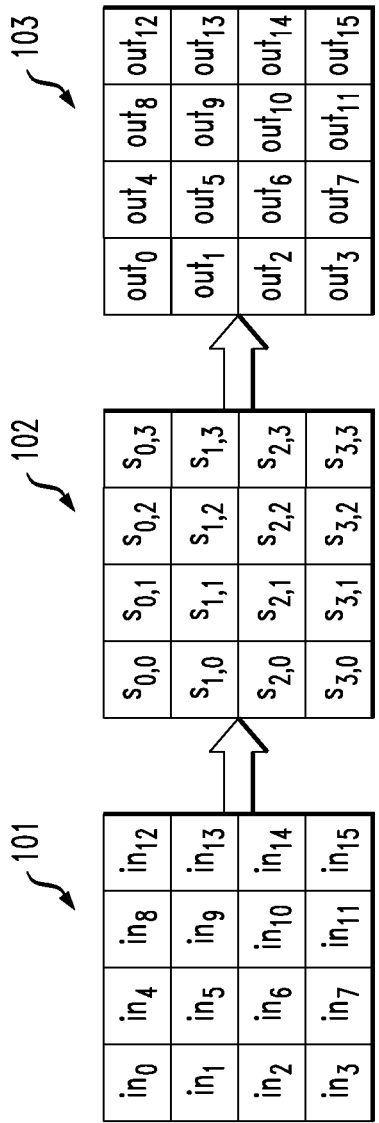
FIG. 1 illustrates the transformation of an input block via a State into an output block, in accordance with the AES standard.

As described above, the multiplications performed as part of the MixColumns( ) transformation involve modulo reduction to keep the results for each byte of the State at 8 bits. This is because some products of 8-bit multiplication would otherwise overflow an 8-bit byte. In one implementation of the present invention, the State is a modified State that comprises a four-by-four matrix of 9-bit numbers instead of the standard four-by-four matrix of 8-bit numbers. Note that, unless otherwise indicated, references to a "State" in descriptions of embodiments of the invention refer to the above-described modified State and its equivalents, even where not preceded by the term "modified." With appropriate corresponding modifications to the transformations of the AES algorithm, which allow the process to avoid having to perform modulo reductions, the number of operations and, thus, the time, required to process a block of data is reduced.

When populating the modified State table, each byte of the input block is copied to the 8 least-significant bits of a corresponding 9-bit number in the modified State whose most-significant bit is set to zero. An alternative substantially equivalent process is to pad each byte of the input block with a preceding zero bit in the process of copying it to the modified State. Note that, unless otherwise indicated, as used herein, (a) {q} and $q_{16}$ refer to hexadecimal (i.e., base 16) number q, (b) k and $k_{10}$ refer to decimal (i.e., base 10) number k, and (c) processing operations are carried out on the binary versions of {q} and/or k.

The SubBytes( ) transform is modified to output an appropriate 8-bit byte for any 9-bit input. One modified SubBytes( ) transform, referred to as ModSubBytes( ), provides (a) the standard SubBytes( ) output for inputs k, where $0 \leq k \leq 255$ and (b) SubBytes(k⊕283) for inputs k, where $256 \leq k \leq 511$. Note that $283 = 2^8 + 2^4 + 2^3 + 2^1 + 2^0$, which corresponds to the $GF(2^8)$ irreducible polynomial $x^8 + x^4 + x^3 + x + 1$. The ModSubBytes( ) function can be represented by Equation (3) below:

$$ModSubBytes(k) = \begin{cases} SubBytes(k) & \text{for } 0 \leq k \leq 255 \\ SubBytes(k \oplus 283) & \text{for } 256 \leq k \leq 511 \end{cases} \quad (3)$$

A lookup table in the form of a modified S-box having 512 entries may be also used to perform this function.

FIG. 5 shows 512-unit S-box 501, designed to be similar in form to S-box 201 of FIG. 2, but which is used to implement the ModSubBytes( ) function. Row {x} and column {y} of S-box 501 represent 9-bit input hexadecimal number {xy}, where {x} represents the five most-significant bits of the 9-bit input, {y} represents the four least-significant bits of the 9-bit input, and the byte at the intersection of row {x} and column {y} represents the 8-bit substitution output for {xy}. Thus, for example, an input of {1a2} would result in an output of {56}, i.e., ModSubBytes({1a2})={56}. It should be noted that the contents of S-box 501 may be reorganized as a one-dimensional, 512-element vector, where the output for ModSubBytes(Hex(k)), where Hex(k) is the hexadecimal analogue to the decimal number k, is the $k^{th}$ element of the vector. In other words, k is the decimal number corresponding to the 9-bit hexadecimal number {xy}. The vector version of the look-up table appears as Equation (4) below:

$$\begin{aligned}
&\{ \\
&63, 7c, 77, 7b, f2, 6b, 6f, c5, 30, 01, 67, 2b, fe, d7, ab, 76, \\
&ca, 82, c9, 7d, fa, 59, 47, f0, ad, d4, a2, af, 9c, a4, 72, c0, \\
&b7, fd, 93, 26, 36, 3f, f7, cc, 34, a5, e5, f1, 71, d8, 31, 15, \\
&04, c7, 23, c3, 18, 96, 05, 9a, 07, 12, 80, e2, eb, 27, b2, 75, \\
&09, 83, 2c, 1a, 1b, 6e, 5a, a0, 52, 3b, d6, b3, 29, e3, 2f, 84, \\
&53, d1, 00, ed, 20, fc, b1, 5b, 6a, cb, be, 39, 4a, 4c, 58, cf, \\
&d0, ef, aa, fb, 43, 4d, 33, 85, 45, f9, 02, 7f, 50, 3c, 9f, a8, \\
&51, a3, 40, 8f, 92, 9d, 38, f5, bc, b6, da, 21, 10, ff, f3, d2, \\
&cd, 0c, 13, ec, 5f, 97, 44, 17, c4, a7, 7e, 3d, 64, 5d, 19, 73, \\
&60, 81, 4f, dc, 22, 2a, 90, 88, 46, ee, b8, 14, de, 5e, 0b, db, \\
&e0, 32, 3a, 0a, 49, 06, 24, 5c, c2, d3, ac, 62, 91, 95, e4, 79, \\
&e7, c8, 37, 6d, 8d, d5, 4e, a9, 6c, 56, f4, ea, 65, 7a, ae, 08, \\
&ba, 78, 25, 2e, 1c, a6, b4, c6, e8, dd, 74, 1f, 4b, bd, 8b, 8a, \\
&70, 3e, b5, 66, 48, 03, f6, 0e, 61, 35, 57, b9, 86, c1, 1d, 9e, \\
&e1, f8, 98, 11, 69, d9, 8e, 94, 9b, 1e, 87, e9, ce, 55, 28, df, \\
&8c, a1, 89, 0d, bf, e6, 42, 68, 41, 99, 2d, 0f, b0, 54, bb, 16, \\
&af, a2, d4, ad, c0, 72, a4, 9c, 7d, c9, 82, ca, f0, 47, 59, fa, \\
&2b, 67, 01, 30, 76, ab, d7, fe, 7b, 77, 7c, 63, c5, 6f, 6b, f2, \\
&e2, 80, 12, 07, 75, b2, 27, eb, c3, 23, c7, 04, 9a, 05, 96, 18, \\
\end{aligned} \quad (4)$$

```
f1, e5, a5, 34, 15, 31, d8, 71, 26, 93, fd, b7, cc, f7, 3f, 36,
39, be, cb, 6a, cf, 58, 4c, 4a, ed, 00, d1, 53, 5b, b1, fc, 20,
b3, d6, 3b, 52, 84, 2f, e3, 29, 1a, 2c, 83, 09, a0, 5a, 6e, 1b,
21, da, b6, bc, d2, f3, ff, 10, 8f, 40, a3, 51, f5, 38, 9d, 92,
7f, 02, f9, 45, a8, 9f, 3c, 50, fb, aa, ef, d0, 85, 33, 4d, 43,
14, b8, ee, 46, db, 0b, 5e, de, dc, 4f, 81, 60, 88, 90, 2a, 22,
3d, 7e, a7, c4, 73, 19, 5d, 64, ec, 13, 0c, cd, 17, 44, 97, 5f,
ea, f4, 56, 6c, 08, ae, 7a, 65, 6d, 37, c8, e7, a9, 4e, d5, 8d,
62, ac, d3, c2, 79, e4, 95, 91, 0a, 3a, 32, e0, 5c, 24, 06, 49,
b9, 57, 35, 61, 9e, 1d, c1, 86, 66, b5, 3e, 70, 0e, f6, 03, 48,
1f, 74, dd, e8, 8a, 8b, bd, 4b, 2e, 25, 78, ba, c6, b4, a6, 1c,
0f, 2d, 99, 41, 16, bb, 54, b0, 0d, 89, a1, 8c, 68, 42, e6, bf,
e9, 87, 1e, 9b, df, 28, 55, ce, 11, 98, f8, e1, 94, 8e, d9, 69
}
```

Thus, for example, an input of {1a2} would result in outputting the 418th element of the vector (since $1a2_{16}=418_{10}$), which is {56}.

Figures 3, 4:
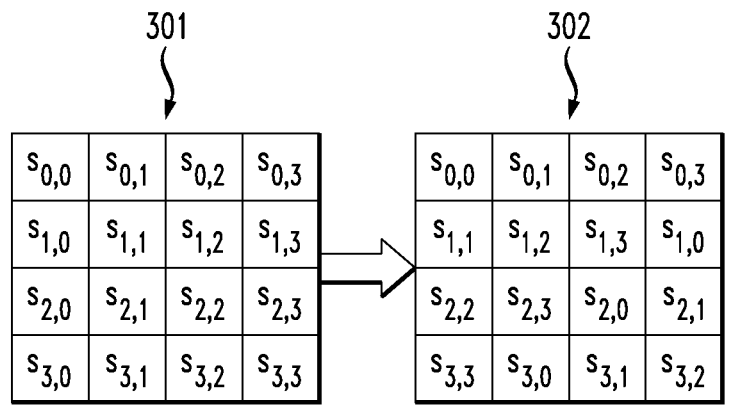
FIG. 3 shows a ShiftRows( ) transformation of a State into a transformed State, in accordance with the AES standard.
FIG. 4 shows the MixColumns( ) transformation for a column of the State as the product of the column, shown as an input vector, with a matrix representing a fixed polynomial, resulting in a new column, shown as an output vector, in accordance with the AES standard.

The modified ShiftRows( ) transformation, or ModShiftRows( ), remains substantially similar to the standard ShiftRows( ) transformation, except that shifted rows are shifted by multiples of 9-bits rather than by 8-bit bytes. If it is assumed that each $s_{i,j}$ is a 9-bit number of the modified State, then the ModShiftRows( ) transformation may be represented by FIG. 3. In one implementation, described in greater detail below, the ModShiftRows( ) and ModSubBytes( ) transformations are combined together into one operation, ModSubBytesShiftRows( ), where a segment of the modified State is replaced with the substitute byte of the resulting segment from the row-shifting operation. Thus, instead of modifying the State once for the ModSubBytes( ) operation and again for the ModShiftRows( ) operations, the State is modified just once for the combined ModSubBytesShiftRows( ) operation. The combined operation may be represented by the equation $sn_{i,j}=\text{ModSubBytes}(s_{i,j+i(mod\ 4)})$, where $sn_{i,j}$ represents the new value of the State element at row i and column j, and $s_{i,j+i(mod\ 4)}$ represents an old State-element value. In other words, ModSubBytesShiftRows($s_{i,j}$)=ModSubBytes($s_{i,j+i\ (mod\ 4)}$). Thus, for example, the value of ModSubBytesShiftRows($s_{2,3}$) would be determined by evaluating ModSubBytes($s_{2,1}$) since j+i (mod 4) here equals 5 (mod 4) which equals 1. Alternatively, the combined operation may be represented as inserting the result of ModSubBytes($s_{i,j}$) into new-State element $sn_{i,j+i(mod\ 4)}$. As noted elsewhere, various schemes are available to preserve necessary old values of State elements for operations subsequent to the updating of the old State-element values.

The modified MixColumns( ) transformation, i.e., ModMixColumns( ), is significantly simpler than the standard MixColumns( ) transformation. Rather than perform the multiplications, modulo reductions, and XOR operations of the standard MixColumns( ) transformation, ModMixColumns( ) performs bit-shifting and XOR operations. ModMixColumns( ) utilizes properties of binary finite fields, wherein (a) multiplication by two can be accomplished by a left shift and (b) multiplication by three, which is equivalent to adding the argument and twice the argument (i.e., 3 m=2 m+m), can be accomplished by a left-shift and a XOR operation, which performs addition in a $GF(2^8)$ finite field.

The ModMixColumns( ) transformation for the elements of input column j of the State is shown below, where (a) the four elements of the input column are $s_{0,j}, \ldots s_{3,j}$ and (b) Shift(a) performs a 1-bit left shift on operand a.

$$\text{ModMixColumns}(s_{0,j})=\text{Shift}(s_{0,j}\oplus s_{1,j})\oplus s_{1,j}\oplus s_{2,j}\oplus s_{3,j} \quad (5.1)$$

$$\text{ModMixColumns}(s_{1,j})=\text{Shift}(s_{1,j}\oplus s_{2,j})\oplus s_{2,j}\oplus s_{3,j}\oplus s_{0,j} \quad (5.2)$$

$$\text{ModMixColumns}(s_{2,j})=\text{Shift}(s_{2,j}\oplus s_{3,j})\oplus s_{3,j}\oplus s_{0,j}\oplus s_{1,j} \quad (5.3)$$

$$\text{ModMixColumns}(s_{3,j})=\text{Shift}(s_{3,j}\oplus s_{0,j})\oplus s_{0,j}\oplus s_{1,j}\oplus s_{2,j} \quad (5.4)$$

Note that every time the Shift( ) operation is performed, the most-significant bit (MSB) of its 9-bit argument will be zero because, after the ModSubBytes( ) transformation, the maximum value of any element in the State is {ff}, and, therefore, the MSB of every 9-bit element is 0. Since the ModShiftRows( ) operation that follows does not alter the values of elements but rather shifts them around the State, the MSB of the bitwise XOR of any two 9-bit elements will be zero. Note further that, after the Shift( ) operation is performed, the LSB of its 9-bit output will be zero because of the 1-bit left shift performed.

The modified AddRoundKey( ) transformation, i.e., ModAddRoundKey( ), operates substantially equivalently to AddRoundKey( ), wherein, for every element of the modified State, the corresponding 8-bit segment of the expanded key schedule, with a zero prefix added, is XORed with the 9-bit element of the modified State. Thus, every round using ModAddRoundKey( ) uses the same 128-bit segment of the expanded key schedule as would be used by the standard procedure. After the final transformation of the final round, the output from each 9-bit element of the modified State are the 8 least-significant bits of the element. Note that, after the final transformation of the final round, the most-significant bit of each 9-bit element in the modified State will be zero.

In another implementation of the transformations, where data registers are used to store entire rows of the State, a different modified AddRoundKey( ) transformation may be combined with the ModMixColumns( ) transformation. In this implementation, each of the four data registers used to store the State is at least 36 bits long.

Figure 6:
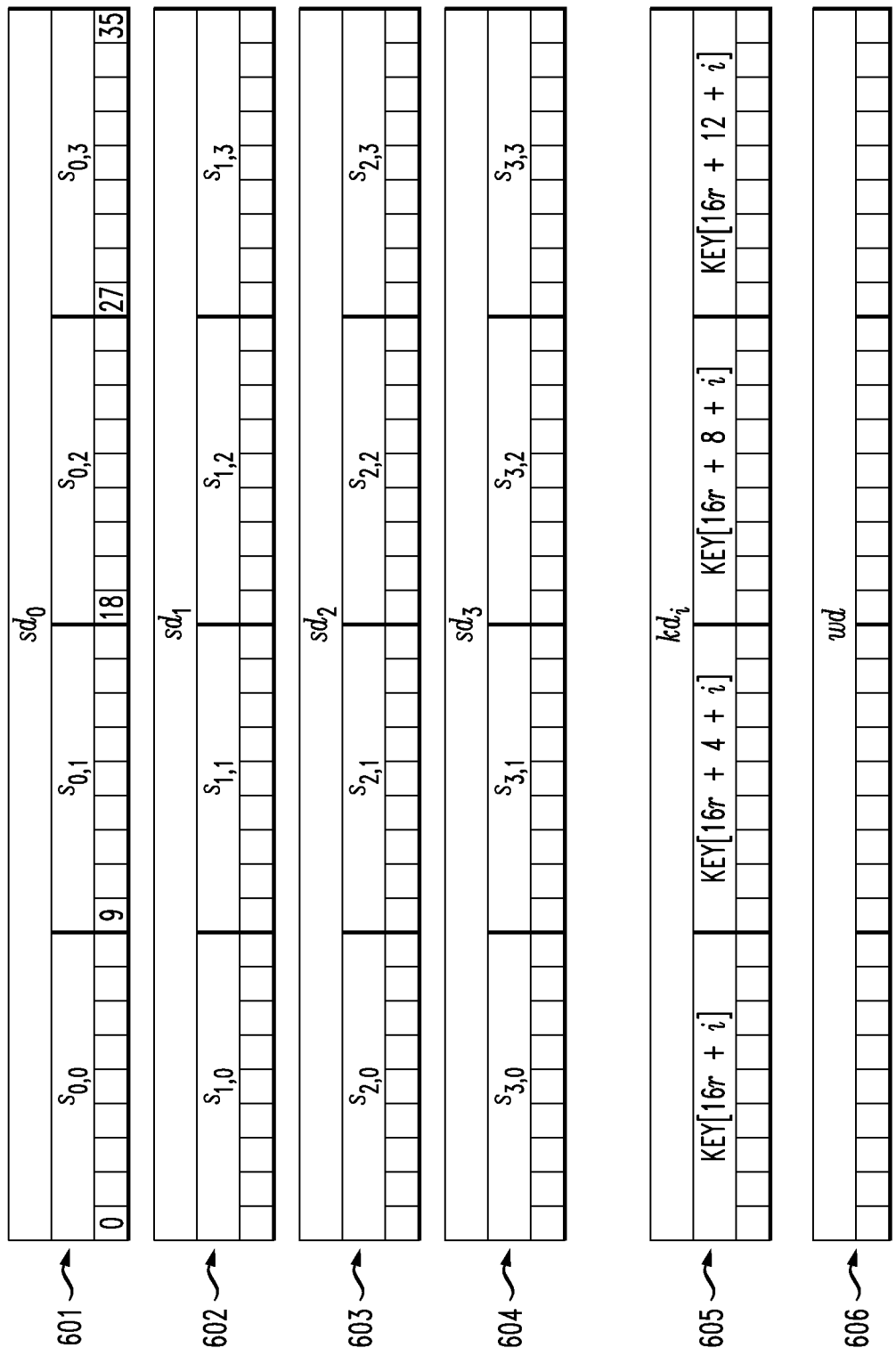
FIG. 6 shows a representation of six 36-bit registers in accordance with one embodiment of the present invention.

FIG. 6 shows a representation of six 36-bit registers; namely, four State registers 601, 602, 603, and 604, expanded key schedule register 605, and work register 606. The contents of State registers 601, 602, 603, and 604 are referred to as $sd_0$, $sd_1$, $sd_2$, and $sd_3$, respectively, where the subscript refers to the row of the State. The contents of expanded key schedule register 605 is referred to as $kd_i$, where the subscript i may be 0, 1, 2, or 3, depending on the particular row of the State that is being processed. The contents of work register 606 is referred to as wd. As shown in FIG. 6, register contents $sd_i$ comprise a concatenation of $s_{i,0}$, $s_{i,1}$, $s_{i,2}$, and $s_{i,3}$. Note that, in this representation of registers, their respective contents are stored such that the most-significant bit of an element is on the left, and the least-significant bit is on the right. Using this register-content notation, the modified MixColumns( ) transformation, ModMixColumns( ), can be described by the formula below:

$$\text{ModMixColumns}(sd_0)=\text{Shift}(sd_0\oplus sd_1)\oplus sd_1\oplus sd_2\oplus sd_3 \quad (6.1)$$

$$\text{ModMixColumns}(sd_1)=\text{Shift}(sd_1\oplus sd_2)\oplus sd_2\oplus sd_3\oplus sd_0 \quad (6.2)$$

$$\text{ModMixColumns}(sd_2)=\text{Shift}(sd_2\oplus sd_3)\oplus sd_3\oplus sd_0\oplus sd_1 \quad (6.3)$$

$$\text{ModMixColumns}(sd_3)=\text{Shift}(sd_0\oplus sd_1)\oplus sd_1\oplus sd_2\oplus sd_3 \quad (6.4)$$

Since each of registers 601, 602, 603, and 604 includes four elements of the modified State, and since four corresponding bytes of the expanded key schedule may be stored in another 36-bit register, the AddRoundKey( ) transformation can be modified to add four bytes of the expanded key schedule to four 9-bit elements of the modified State. The contents of register 605, referred to as $kd_i$, comprise four bytes of the expanded key schedule corresponding to row i of the State.

Note that, since consecutive bytes of the expanded key schedule correspond to State elements first going down columns then across rows, while the above-described registers store State elements across rows then down columns, the bytes of the expanded key schedule in $kd_i$ are not consecutive. Thus, $kd_i$ for round r and row i comprises a prefix-padding and concatenation of key[16r+i], key[16r+4+i], key[16r+8+i], and key[16r+12+i], where key[n] refers to the nth byte of the expanded key schedule. Note that, in register 605, prefix-padding key[n] is equivalent to storing the operand n in the eight least-significant bits of the assigned 9-bit storage space and setting the MSB of the 9-bit storage space to zero. In addition, note that, in this implementation, the bytes in a register increment from left to right; however, in other implementations, the bytes in a register may increment from right to left.

Figure 7:
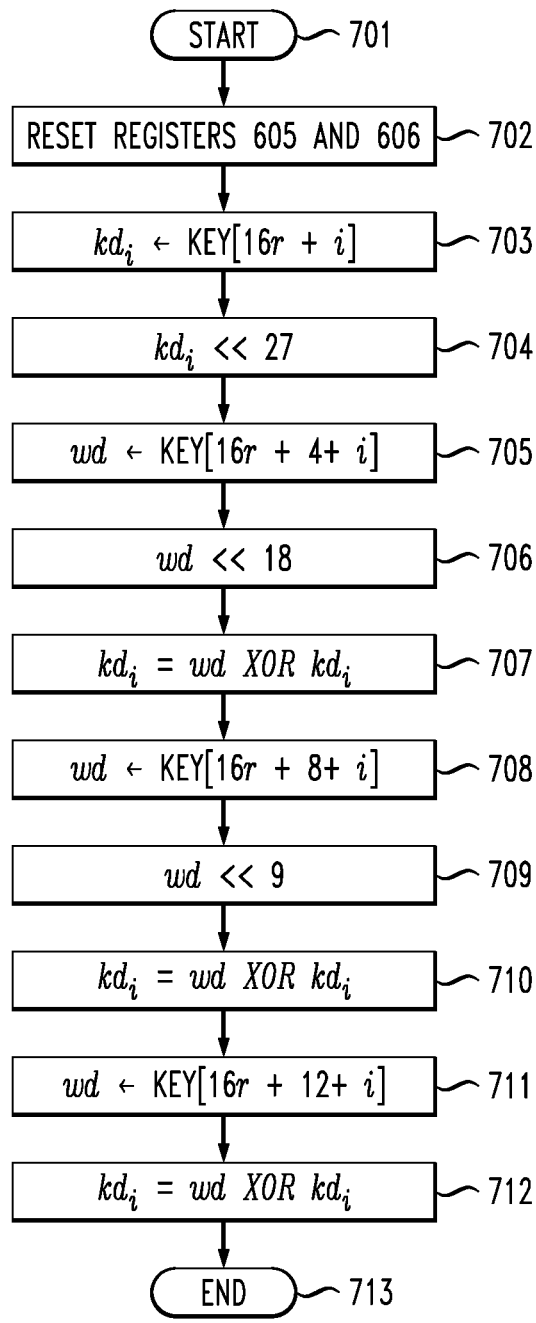
FIG. 7 shows a flowchart representing one alternative way to populate a register of FIG. 6 with an appropriate value using a working register of FIG. 6.

FIG. 7 shows flowchart 700 representing one alternative way to populate register 605 of FIG. 6 with the appropriate value of $kd_i$ using working register 606. The procedure of flowchart 700 uses bit-shifting and XOR operations to achieve the above-described padding and concatenation of four key[n] terms to provide the appropriate $kd_i$ term. The process starts with step 701. Registers 605 and 606, i.e., $kd_i$ and wd, are set to zero (step 702). Next, key[16r+i] is input to $kd_i$ (step 703) and left-shifted 27 bits (step 704). Then, key[16r+4+i] is input to wd (step 705) and left-shifted 18 bits (step 706). Next, $kd_i$ is set to wd⊕$kd_i$ (step 707). Then, key[16r+8+i] is input to wd (step 708) and left-shifted 9 bits (step 709). Next, $kd_i$ is set to wd⊕$kd_i$ (step 710). Then, key[16r+12+i] is input to wd (step 711). Next, $kd_i$ is set to wd $kd_i$ (step 712), whereupon $kd_i$ has the appropriate value for performing the ModAddRoundKey( ) transformation for round r and row i, and the process terminates (step 713). Note that the above-described inputting steps clear the previous contents of the corresponding registers and, therefore, step 702 may be skipped.

A combined modified MixColumns( ) and modified AddRoundKey( ) transformation can be represented by Equation (7) below, where the subscript i of $kd_i$ is replaced with the corresponding row number:

$$new\_sd_0 = \text{Shift}(sd_0 \oplus sd_1) \oplus sd_1 \oplus sd_2 \oplus sd_3 \oplus kd_0 \quad (7.1)$$

$$new\_sd_1 = \text{Shift}(sd_1 \oplus sd_2) \oplus sd_2 \oplus sd_3 \oplus sd_0 \oplus kd_1 \quad (7.2)$$

$$new\_sd_2 = \text{Shift}(sd_2 \oplus sd_3) \oplus sd_3 \oplus sd_0 \oplus sd_1 \oplus kd_2 \quad (7.3)$$

$$new\_sd_3 = \text{Shift}(sd_0 \oplus sd_1) \oplus sd_1 \oplus sd_2 \oplus sd_3 \oplus kd_3 \quad (7.4)$$

As can be seen from Equation (7), old State values, such as $sd_0$, are used in the calculation of each of the new State values, such as $new\_sd_3$. Consequently, problems will arise if an implementation overwrites an old State value before all the new State values are calculated. One solution is to use two or more sets of State registers to implement Equation (7), where, during each round, the State is moved to a set of registers different from the set of State registers used in the preceding round. Note that, with two sets of State registers, the State can shift back and forth between the two sets in each round.

Another implementation keeps the State in a single set of registers, but uses some additional registers to store temporary values used in the calculations of Equation (7). Table 1 below shows operations used to generate new values for the elements of the State, where each column shows operations for the specified row (e.g., $sd_2$) of the state that result in the round's new value for the row (e.g., $new\_sd_2$) The operations may be interleaved and some may be performed simultaneously, depending on the particular implementation. In Table 1 below, $M_x$ and $t_x^{(y)}$ all represent 36-bit registers storing temporary values. Note that the different $M_x$ and $t_x^{(y)}$ variables shown do not necessarily represent separate and distinct registers since the same register may be used to hold two or more of the temporary values shown over the course of processing the State during a round. Also note that the multiplications by 2 shown in Table 1 are performed by a 1-bit left-shift, as described above.

TABLE 1

| $sd_0$ | $sd_1$ | $sd_2$ | $sd_3$ |
|---|---|---|---|
| $M_0 = 2*sd_0$ | $M_1 = 2*sd_1$ | $M_2 = 2*sd_2$ | $M_3 = 2*sd_3$ |
| $t_1^{(0)} = sd_1 \oplus kd_0$ | $t_1^{(1)} = sd_0 \oplus kd_1$ | $t_1^{(2)} = kd_2 \oplus sd_0$ | $t_1^{(3)} = sd_0 \oplus sd_1$ |
| $t_2^{(0)} = t_1^{(0)} \oplus M_0$ | $t_2^{(1)} = t_1^{(1)} \oplus M_1$ | $t_2^{(2)} = t_1^{(2)} \oplus sd_1$ | $t_2^{(3)} = t_1^{(3)} \oplus M_0$ |
| $t_3^{(0)} = t_2^{(0)} \oplus M_1$ | $t_3^{(1)} = t_2^{(1)} \oplus sd_2$ | $t_3^{(2)} = t_2^{(2)} \oplus sd_3$ | $t_3^{(3)} = t_2^{(3)} \oplus sd_2$ |
| $t_4^{(0)} = t_3^{(0)} \oplus sd_2$ | $t_4^{(1)} = t_3^{(1)} \oplus M_2$ | $t_4^{(2)} = t_3^{(2)} \oplus M_3$ | $t_4^{(3)} = t_3^{(3)} \oplus kd_3$ |
| $new\_sd_0 = t_4^{(0)} \oplus sd_3$ | $new\_sd_1 = t_4^{(0)} \oplus sd_3$ | $new\_sd_2 = t_4^{(0)} \oplus M_2$ | $new\_sd_3 = t_4^{(0)} \oplus M_3$ |

The above-described operations may use the regular expanded key schedule or a modified expanded key schedule, as explained below.

In one implementation, the 176-byte expanded key schedule is replaced with a 320-byte expanded key schedule that is used in conjunction with the modified MixColumn( ) and modified AddRoundKey( ) transformations described above. The 320-byte expanded key schedule is derived from the 176-byte expanded key schedule. With the 320-byte expanded key schedule, 16 bytes are used in each of the first and eleventh rounds (i.e., for r=0 and 10), while 32 bytes are used in each of the second through tenth rounds (i.e., for r=1-9), for a total of 320 bytes. The 320-byte expanded key schedule can be obtained using Equation (8) below, where (i) vector[n] refers to the nth (8-bit) byte of one-dimensional array vector, (ii) vector[n . . . m] refers to bytes n through m of array vector, (iii) new_key[ ] refers to the 320-byte expanded key schedule, (iv) key[ ] refers to the 176-byte expanded key schedule, (v) temp1 and temp2 are temporary variables, and (vi) e∥$0^n$ means suffix-padding n zeroes to e:

| | |
|---|---|
| new_key[k] = key[k] for k = 0 .. 15 | (8.1) |
| new_key[k] = key[k − 72] for k = 232 .. 247 | (8.2) |
| for r = 1 to 9 | |
| { | |
| temp1 = key[16r] ⊕ (key[16r + 4] ∥$0^9$) | (8.3.1) |
| temp2 = key[16r + 8] ⊕ (key[16r + 12] ∥$0^9$) | (8.3.2) |
| new_key[24r + 4 .. 24r + 7] = temp1[0 .. 3] | (8.3.3) |
| new_key[24r .. 24r + 3] = temp2[0 .. 3] | (8.3.4) |
| temp1 = key[16r + 1] ⊕ (key[16r + 5] ∥$0^9$) | (8.3.5) |
| temp2 = key[16r + 9] ⊕ (key[16r + 13] ∥$0^9$) | (8.3.6) |
| new_key[24r − 8 .. 24r − 5] = temp1[0 .. 3] | (8.3.7) |
| new_key[24r − 4 .. 24r − 1] = temp2[0 .. 3] | (8.3.8) |
| temp1 = key[16r + 2] ⊕ (key[16r + 6] ∥$0^9$) | (8.3.9) |
| temp2 = key[16r + 10] ⊕ (key[16r + 14] ∥$0^9$) | (8.3.10) |
| new_key[8r + 240 .. 8r + 243] = temp1[0 .. 3] | (8.3.11) |

-continued

| | |
|---|---|
| new_key[8r + 244 .. 8r + 247] = temp2[0 .. 3] | (8.3.12) |
| temp1 = key[16r + 3] ⊕ (key[16r + 7] \|\|0⁹) | (8.3.13) |
| temp2 = key[16r + 11] ⊕ (key[16r + 15] \|\|0⁹) | (8.3.14) |
| new_key[24r + 8 .. 24r + 11] = temp1[0 .. 3] | (8.3.15) |
| new_key[24r + 12 .. 24r + 15] = temp2[0 .. 3] | (8.3.16) |
| } | |

Note that bytes in arrays key[ ] and new_key[ ] in Equation (8) increment from right to left. So that, if, for example, for r=1, key[16]="1000 0001" and key[20]="1100 0011," then, per Equation (8.3.1), temp1=key[16]⊕(key[20]\|\|0⁹)="0000 0000 0000 0001 1000 0110 1000 0001" and, per Equation (8.3.3), new_key[28]="1000 0001", new_key[29]="1000 0110", new_key[30]="0000 0001", and new_key[31]="0000 0000."

Figures 8, 9:
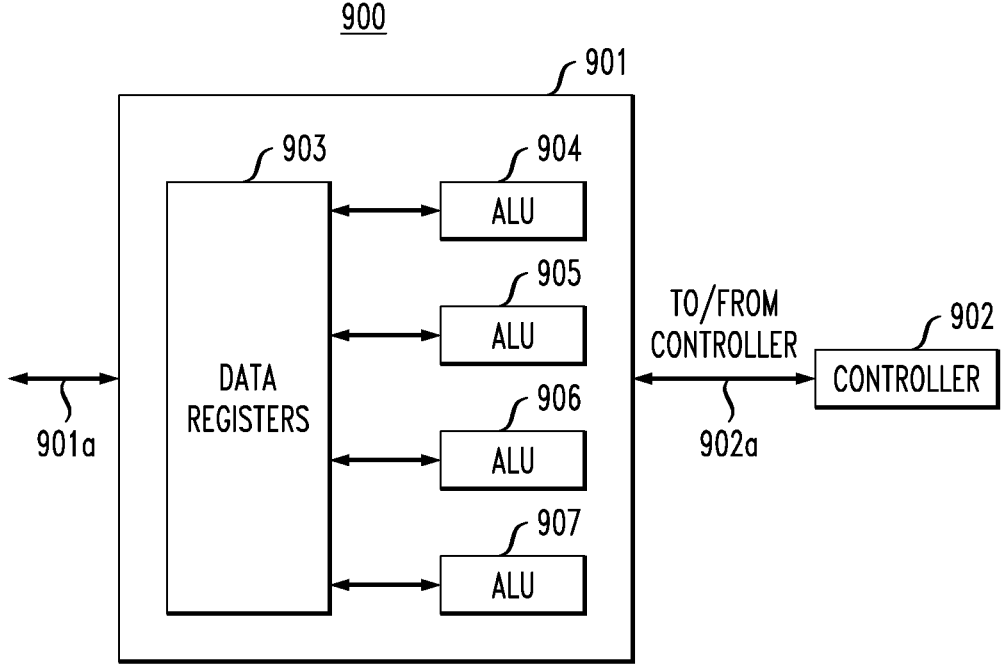
FIG. 8 shows a table that shows how the bytes of a 320-byte expanded key schedule are used up in a 128-bit AES encryption process.
FIG. 9 shows a simplified block diagram of a processing device in accordance with one embodiment of the present invention.

FIG. 8 shows Table 801, which shows which bytes of the 320-byte expanded key schedule are used up in each of the 11 rounds of the 128-bit AES encryption process (i.e., for 128-bit keys). Note that, in inverse-cipher processing, the bytes are used in reverse order. Round 0 uses new_key[0 ... 15] for $kd_0$–$kd_3$; in other words, $kd_i$=new_key[4i ... 4i+3]. For rounds 1-9, $kd_i$=key1(r,i)⊕(key2(r,i)<<18), where key1(r,i) and key2(r,i) for round r and row i are obtained as shown below:

$$key1(r,0)=new\_key[24*r+4 \ldots 24*r+7]$$

$$key2(r,0)=new\_key[24*r \ldots 24*r+3] \quad (9.1)$$

$$key1(r,1)=new\_key[24*r-8 \ldots 24*r-5]$$

$$key2(r,1)=new\_key[24*r-4 \ldots 24*r-1] \quad (9.2)$$

$$key1(r,2)=new\_key[8*r+240 \ldots 8*r+243]$$

$$key2(r,2)=new\_key[8*r+244 \ldots 8*r+247] \quad (9.3)$$

$$key1(r,3)=new\_key[24*r+8 \ldots 24*r+11]$$

$$key2(r,3)=new\_key[24*r+12 \ldots 24*r+15] \quad (9.4)$$

Round 11 uses new_key[232 ... 247] for $kd_0$–$kd_3$; in other words, $kd_i$=new_key[232+4i ... 4i+235]. As can be seen from Equation (9) above, the calculation of each $kd_i$ in rounds 1-9 involves the XORing of two consecutive 32-bit elements of the 320-byte expanded key schedule, followed by XORing of the calculated $kd_i$ with the appropriate $sd_i$. Assuming the use of an appropriate processor, such as the StarCore 3400 processor core from StarCore LLC, formerly of Austin, Tex., the reading of the two key elements can be performed in a single clock cycle. Consequently, for each round, 4 read operations and 8 XOR operations are required for performing this implementation of the ModAddRoundKey( ) operation. In comparison, using the 176-byte expanded key schedule, where each element of the State gets individually XORed to the corresponding segment of the key schedule, would require 16 read operations and 16 XOR operations per round for the AddRoundKey( ) operation.

FIG. 9 shows a simplified block diagram of processing system 900 in accordance with one embodiment of the present invention. Processing system 900 comprises processing device 901 and controller 902. Processing device 901 comprises (i) data registers module 903, which comprise a plurality of data registers, and (ii) arithmetic logic units (ALUs) 904, 905, 906, and 907. Processing device 901 receives and outputs data, such as (without limitation) data blocks and keys, via path 901a. Processing device 901 is controlled by controller 902, to which processing device 901 is connected via path 902a. Processing device 901 is capable of performing four ALU operations and two read/write (i.e., input/output or I/O) operations per clock cycle. The read/write operations are carried out by an address-generation unit (AGU) (not shown) that can perform multiple I/O operations per clock cycle. Processing device 901 may be used to implement embodiments of the invention described elsewhere herein.

The combined ModSubBytes( ) and ModShiftRows( ) transformation, ModSubBytesShiftRows( ), described above, may be performed using the following sequence of operations for each element $s_{i,j}$ of the 16 elements of the modified State. First, an ALU extracts the 9-bit value k stored by element $s_{i,j}$ from the corresponding register value $sd_i$. Next, an ALU calculates the address of the substitution value for k in the lookup table. If, for example, the elements of the lookup table are stored in consecutively addressed 1-byte (8-bit) memory slots, then the address for the substitute value for value k would be at address k+(the address of the first element of the lookup table). This is so because, as described above, the lookup table may be considered a one-dimensional array (i.e., a vector). As would be appreciated by one of ordinary skill in the art, simple adjustments would be made to this calculation in embodiments having different memory-organization schemes. The calculated address is then uploaded to an address register (not shown). Next, an AGU reads the value at the uploaded address. Then, an ALU inserts the read value into the $s_{i,j+i(mod\ 4)}$ modified-State element in the corresponding register, which stores $sd_i$. Note that certain processors may perform one or more processor-stall operations between certain ALU operations.

FIG. 10 shows Table 1001, representing operations of ModSubBytesShiftRows( ), the combined ModSubBytes( ) and ModShiftRows( ) transformation, performed by ALUs and AGUs of processing device 901 of FIG. 9 for one AES round. Each of the 23 rows represents one clock cycle. The columns represent ALU and AGU operations. Note that consecutive operations in the same column do not have to be performed by the same ALU or AGU. Also note that only 3 ALUs are needed to perform the parallel processing shown. Em represents the above-described ALU-performed extraction operation for an mth element of the modified state. Cm represents the above-described ALU-performed calculation operation for that mth element of the modified state. Um represents the above-described AGU-performed uploading operation for that mth element of the modified state. Rm represents the above-described AGU-performed reading operation for that mth element of the modified state. Im represents the above-described ALU-performed insertion operation for that mth element of the modified state.

FIG. 11 shows Table 1101, which shows, for each m of Table 1001, which element of the modified State ("current State") corresponds to m, and into which element of the modified State the calculated result of the operations for the round is inserted ("next State"). For example, m=6 corresponds to element $s_{1,1}$ of the modified State, where the result of the extraction, calculation, upload, and read operations is inserted into element $s_{1,0}$ of the modified State for the next round.

FIG. 12 shows Table 1201, representing operations of ModSubBytesShiftRows( ) performed by ALUs and AGUs of processing device 901 of FIG. 9 for one AES round over 22 clock cycles. Note that Table 1201 shows operations for intermediate rounds of AES processing The initial round (also known as round 0), in which the only transformation is the addition of the first round key, is combined with the first round and together take 26 clock cycles. In the final round, there is no column-mixing transformation, and so that round is differently optimized and takes 24 clock cycles. For the intermediate rounds represented by Table 1201, a one-clock-cycle reduction for the round is made possible by reordering the extraction operations. This allows the C1, I1, U1, and R1 operations shown to correspond to the E1 operations of the previous round, and the E1 operation shown to correspond to the C1, I1, U1, and R1 operations of the subsequent round. Also note that operations for a particular value of m in a round may write results of operations to registers different from the registers of the operands of the operations.

FIG. 13 shows Table 1301, representing operations of the ModSubBytesShiftRows( ) transformation together with some preparatory operations for the above-described combined ModMixColumns( ) and ModAddRoundKey( ) transformation, as performed by the ALUs and AGUs of processing device 901 of FIG. 9 for one AES round over 22 clock cycles. Note that, since the ModMixColumns( ) and ModAddRoundKey( ) transformations are not combined in the first and last rounds, Table 1301 represents the operations for the intermediate rounds. RKn represents one of five read-key operations for reading key values from the 320-byte modified expanded key schedule. Note that RK1, RK2, and RK5 read both key1(r, i) and key2(r, i), while RK3 and RK4 read only one or the other for a total of 8 key-read operations for a round. CKn represents one of six combine/copy key operations for combining the read key values, where CK4 and CK5 are just copy operations for a total of 4 key-combine operations for a round. Note that, although insertion operations, i.e., are generally performed by ALUs, Table 1301 shows the I1 and I9 insertion operations performed in conjunction with the R1 and R9 reading operations, respectively, by AGUs. The per-clock-cycle distribution of operations shown in Table 1301 allows for efficient use of the resources of processing device 901 and similar processors, wherein fewer clock cycles are required per round than would otherwise be required.

Embodiments of the invention have been described using multi-element registers and particular procedures for populating the multi-element registers. As would be appreciated by one of ordinary skill in the art, various alternative methods are available that remain within the scope of the present invention. Alternative embodiments may use different-size registers, where the registers store more or fewer elements than the described embodiments. As would be appreciated by one of ordinary skill in the art, bitwise procedures described above may be performed by various combinations of digital operations such as (without limitations) bit shifting, XOR, OR, AND, and NOT, where the particular operations used may depend on the particular physical implementation used.

Embodiments of the invention have been described wherein a 128-bit key is used. Embodiments for keys of a different length, such as (without limitation) 192 or 256 bits, may be implemented with minor adjustments to account for the different expanded key schedule and number of rounds, as would be appreciated by one of ordinary skill in the art. These alternative embodiments are within the scope of the invention.

Embodiments of the invention have been described with (i) particular sizes for blocks, words, and modified-State elements and (ii) particular numbers of modified-State rows, modified-State columns, and processing rounds. Alternative embodiments may have different sizes of elements and/or different numbers of elements, with appropriate corresponding modifications, as would be understood by a person of ordinary skill in the art, without departing from the scope of the invention.

Embodiments of the invention have been described using particular conventions for correlating binary numbers to the contents of electronic memory. As would be appreciated by one of ordinary skill in the art, various manipulations, inversions, re-orderings, and reversals of bits are possible that do not depart from the scope of the present invention.

Embodiments of the invention have been described where the data registers are at least 36-bits long and each data register stores four elements of the modified State. In alternative embodiments of the invention, larger data registers are used. In some alternative embodiments, more than four elements of the modified State are stored in each data register used for storing the modified State.

Embodiments of the invention have been described where the elements of the modified State are 9 bits long. In alternative embodiments of the invention, the elements of the invention are longer than 9 bits each. In one embodiment of the invention, each element is stored in a 2-byte memory slot. As would be appreciated by one of ordinary skill in the art, simple modifications would be made to the above-described embodiments to account for the different-sized elements.

References herein to the verb "to set" and its variations in reference to values of fields do not necessarily require an active step and may include leaving a field value unchanged if its previous value is the desired value. Setting a value may nevertheless include performing an active step even if the previous or default value is the desired value.

Unless indicated otherwise, the term "determine" and its variants as used herein refer to obtaining a value through measurement and, if necessary, transformation. For example, to determine an electrical-current value, one may measure a voltage across a current-sense resistor, and then multiply the measured voltage by an appropriate value to obtain the electrical-current value. If the voltage passes through a voltage divider or other voltage-modifying components, then appropriate transformations can be made to the measured voltage to account for the voltage modifications of such components and to obtain the corresponding electrical-current value.

Exemplary embodiments have been described wherein particular entities (a.k.a. modules) perform particular functions. However, the particular functions may be performed by any suitable entity and are not restricted to being performed by the particular entities named in the exemplary embodiments.

Exemplary embodiments have been described with data flows between entities in particular directions. Such data flows do not preclude data flows in the reverse direction on the same path or on alternative paths that have not been shown or described. Paths that have been drawn as bidirectional do not have to be used to pass data in both directions.

References herein to the verb "to generate" and its variants in reference to information or data do not necessarily require the creation and/or storage of new instances of that information. The generation of information could be accomplished by identifying an accessible location of that information. The generation of information could also be accomplished by having an algorithm for obtaining that information from accessible other information.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. A cryptography processor comprising:
one or more arithmetic logic units (ALUs); and
a plurality of data registers, wherein the processor is adapted to:
receive an a-bit-long block of data, wherein the block of data is organized as a/n n-bit words;
store the a/n n-bit words as a state in the data registers, wherein the state is a matrix having b>1 rows and c>1 columns of p-bit state elements, wherein:
a, n, p, b, c, and a/n are positive integers;
$p \geq 9$;
$p > n$;
$a/n > 1$;
each n-bit word of data is stored in a corresponding p-bit state element; and
$b*c*n = a$; and
perform a column-mixing transformation on the state using the one or more ALUs, wherein the column-mixing transformation involves generating finite-field products using bit-shifting and XOR operations.

2. The processor of claim 1, wherein:
a is 128;
n is 8;
a/n is 16;
b is 4; and
c is 4.

3. The processor of claim 1, wherein:
the processor is adapted to process the data block in a manner compatible with the Advanced Encryption Standard (AES); and
the processing comprises transforming the state over a plurality of rounds comprising an element-substitution transformation, a row-shifting transformation, a column-mixing transformation, and a round-key-adding transformation.

4. The processor of claim 3, wherein:
the element-substitution transformation, ModSubBytes (k), is performed on an element k of the state, where k is a decimal representation of the value of the element, such that $$ModSubBytes(k) = \begin{cases} SubBytes(k) & \text{for } 0 \leq k \leq 255 \\ SubBytes(k \oplus 283) & \text{for } 256 \leq k \leq 511; \end{cases}$$

SubBytes(k) represents the AES SubBytes( ) transformation for k; and
$\oplus$ is an XOR operator.

5. The processor of claim 4, wherein:
the processor is adapted to perform a ModSubBytesShiftRows( ) transformation, which combines the row-shifting and element-substitution transformations, on elements of the state;
$ModSubBytesShiftRows(s_{i,j}) = ModSubBytes(s_{i,j+i(mod\,4)})$;
$s_{i,j}$ represents the value of the state element at row i and column j; and
mod represents modulo reduction.

6. The processor of claim 3, wherein the row-shifting transformation ModShiftRows( ) circularly shifts each row of the state by d*p bits, wherein d is a non-negative integer.

7. The processor of claim 3, wherein:
the four elements of column j of the state are represented as $s_{0,j}, \ldots, s_{3,j}$;
Shift(w) performs a 1-bit left shift on operand w;
the column-mixing transformation ModMixColumns( ) is performed after the element-substitution transformation of the round; and
the operations of the ModMixColumns( ) transformation for the elements of column j of the state are:

$ModMixColumns(s_{0,j}) = Shift(s_{0,j} \oplus s_{1,j}) \oplus s_{1,j} \oplus s_{2,j} \oplus s_{3,j}$;

$ModMixColumns(s_{1,j}) = Shift(s_{1,j} \oplus s_{2,j}) \oplus s_{2,j} \oplus s_{3,j} \oplus s_{0,j}$;

$ModMixColumns(s_{2,j}) = Shift(s_{2,j} \oplus s_{3,j}) \oplus s_{3,j} \oplus s_{0,j} \oplus s_{1,j}$; and $ModMixColumns(s_{3,j}) = Shift(s_{3,j} \oplus s_{0,j}) \oplus s_{0,j} \oplus s_{1,j} \oplus s_{2,j}$.

8. The processor of claim 3, wherein:

b=c=4;

Shift(w) performs a 1-bit left shift on operand w;

rows 0, 1, 2, and 3 of the state are stored as $sd_0$, $sd_1$, $sd_2$, and $sd_3$, respectively, on four corresponding data registers of the plurality of data registers;

the operations of column-mixing transformation ModMix-Columns( ) for the rows of the state are:

$ModMixColumns(sd_0)=Shift(sd_0 \oplus sd_1) \oplus sd_1 \oplus sd_2 \oplus sd_3;$ $ModMixColumns(sd_1)=Shift(sd_1 \oplus sd_2) \oplus sd_2 \oplus sd_3 \oplus sd_0;$ $ModMixColumns(sd_2)=Shift(sd_2 \oplus sd_3) \oplus sd_3 \oplus sd_0 \oplus sd_1;$ and $ModMixColumns(sd_3)=Shift(sd_0 \oplus sd_1) \oplus sd_1 \oplus sd_2 \oplus sd_3.$

9. The processor of claim 3, wherein:

the processor is adapted to:
combine the performance of the column-mixing and the round-key-adding transformations; and
generate an AES-expanded key schedule from a key corresponding to the data block, the expanded key schedule comprising expanded-key-schedule elements corresponding to elements of the state for particular rounds of processing;

b=c=4;

i is a non-negative integer;

Shift(w) performs a 1-bit left shift on operand w;

rows 0, 1, 2, and 3 of the state are stored as $sd_0$, $sd_1$, $sd_2$, and $sd_3$, respectively, on four corresponding data registers of the plurality of data registers;

the four elements of the expanded key schedule corresponding to row i of the state for a particular round are stored together in one of the plurality of data registers as $kd_i$;

$kd_i$ for round r, where r is a non-negative integer, is equivalent to the concatenation of prefix-padded bytes of the AES-expanded key schedule, namely key[16r+i], key[16r+4+i], key[16r+8+i], and key[16r+12+i];

key[n] refers to the nth byte of the AES-expanded key schedule; and performing the combined column-mixing and round-key-adding transformation of the state for the particular round yields four new rows, new_$sd_0$, . . . , new_$sd_3$, wherein:

$new\_sd_0=Shift(sd_0 \oplus sd_1) \oplus sd_1 \oplus sd_2 \oplus sd_3 \oplus kd_0;$ $new\_sd_1=Shift(sd_1 \oplus sd_2) \oplus sd_2 \oplus sd_3 \oplus sd_0 \oplus kd_1;$ $new\_sd_2=Shift(sd_2 \oplus sd_3) \oplus sd_3 \oplus sd_0 \oplus sd_1 \oplus kd_2;$ and $new\_sd_3=Shift(sd_0 \oplus sd_1) \oplus sd_1 \oplus sd_2 \oplus sd_3 \oplus kd_3.$

10. The processor of claim 3, wherein:

the processor is adapted to:
generate an AES-expanded key schedule, key[ ], from a key corresponding to the data block, the expanded key schedule comprising expanded-key-schedule elements corresponding to elements of the state for particular rounds of processing; and
generate a 320-byte expanded key schedule, new_key[ ], from key[ ] using the following procedure, where temp1 and temp2 are temporary variables, vectode[e . . . f] refers to bytes e through f of array vector, and $d\|0^g$ means suffix-padding g zeroes to d:

```
new_key[k] = key[k] for k = 0 .. 15;
new_key[k] = key[k − 72] for k = 232 .. 247; and
for r = 1 to 9
{
  temp1 = key[16r] ⊕ (key[16r + 4] ||0⁹)
  temp2 = key[16r + 8] ⊕ (key[16r + 12] ||0⁹)
  new_key[24r + 4 .. 24r + 7] = temp1[0 .. 3]
  new_key[24r .. 24r + 3] = temp2[0 .. 3]
  temp1 = key[16r + 1] ⊕ (key[16r + 5] ||0⁹)
  temp2 = key[16r + 9] ⊕ (key[16r + 13] ||0⁹)
  new_key[24r − 8 .. 24r − 5] = temp1[0 .. 3]
  new_key[24r − 4 .. 24r − 1] = temp2[0 .. 3]
  temp1 = key[16r + 2] ⊕ (key[16r + 6] ||0⁹)
  temp2 = key[16r + 10] ⊕ (key[16r + 14] ||0⁹)
  new_key[8r + 240 .. 8r + 243] = temp1[0 .. 3]
  new_key[8r + 244 .. 8r + 247] = temp2[0 .. 3]
  temp1 = key[16r + 3] ⊕ (key[16r + 7] ||0⁹)
  temp2 = key[16r + 11] ⊕ (key[16r + 15] ||0⁹)
  new_key[24r + 8 .. 24r + 11] = temp1[0 .. 3]
  new_key[24r + 12 .. 24r + 15] = temp2[0 .. 3]
}; and
``` using new_key[ ] instead of key[ ] for performing the round-key-adding transformations of the rounds.

11. The processor of claim 10, wherein:

the key corresponding to the data block is 128-bits long;

i is a non-negative integer;

the four elements of new¯key[ ] corresponding to row i in a particular transformation round are stored together as $kd_i$ in one of the plurality of data registers;

for the initial round, $kd_i$=new_key[4i . . . 4i+3];

for rounds 1 through 9, $kd_i$=key1(r,i)$\oplus$(key2(r,i)<<18), where key1(r,i) and key2(r,i) for round r and row i are obtained as follows:

key1(r,0)=new_key[24*r+4 . . . 24*r+7];

key2(r,0)=new_key[24*r . . . 24*r+3];

key1(r,1)=new_key[24*r−8 . . . 24*r−5];

key2(r,1)=new_key[24*r−4 . . . 24*r−1];

key1(r,2)=new_key[8*r+240 . . . 8*r+243];

key2(r,2)=new_key[8*r+244 . . . 8*r+247];

key1(r,3)=new_key[24*r+8 . . . 24*r+11]; and key2(r,3)=new_key[24*r+12 . . . 24*r+15]; and for round 11, $kd_i$=new_key[232+4i . . . 4i+235].

12. The processor of claim 11, wherein, the processor is adapted to perform each of the key-adding transformations for rounds 1 through 9 using no more than four read operations and eight XOR operations.

13. The processor of claim 3, wherein:

b=c=4;

i and r are non-negative integers;

rows 0, 1, 2, and 3 of the state are stored as $sd_0$, $sd_1$, $sd_2$, and $sd_3$, respectively, on four corresponding data registers of the plurality of data registers;

the four elements of the expanded key schedule corresponding to row i of the state for a particular round are stored together in one of the plurality of data registers as $kd_i$;

the content of a work register, which is one of the plurality of data registers, is stored as wd; and the processor is adapted to:
generate an AES-expanded key schedule from a key corresponding to the data block, the expanded key schedule key[ ] comprising expanded-key-schedule elements corresponding to elements of the state for particular rounds of processing; and populate the data register storing $kd_i$ by performing:
setting $kd_i$ to key[16r+i];
left-shifting $kd_i$ by 3*p bits;
setting wd to key[16r+4+i];
left-shifting wd by 2*p bits;
setting $kd_i$ to wd⊕$kd_i$;
setting wd to key[16r+8+i];
left-shifting wd by p bits;
setting $kd_i$ to wd⊕$kd_i$;
setting wd to key[16r+12+i]; and
setting $kd_i$ to wd⊕$kd_i$.

14. The processor of claim 3, wherein:
b=c=4;
i is a non-negative integer;
rows 0, 1, 2, and 3 of the state are stored as $sd_0$, $sd_1$, $sd_2$, and $sd_3$, respectively, on four corresponding data registers of the plurality of data registers;
the four elements of the expanded key schedule corresponding to row i of the state for a particular round are stored together in one of the plurality of data registers as $kd_i$;
the processor is adapted to perform the column-mixing and round-key-adding transformations in combination to generate transformed rows of the state referred to as new_$sd_0$, new_$sd_1$, new_$sd_2$, and new_$sd_3$, respectively, by performing:
for row 0:

$M_0 = 2 * sd_0$;

$t_1^{(0)} = sd_1 \oplus kd_0$;

$t_2^{(0)} = t_1^{(0)} \oplus M_0$;

$t_3^{(0)} = t_2^{(0)} \oplus M_1$;

$t_4^{(0)} = t_3^{(0)} \oplus sd_2$; and new_$sd_0 = t_4^{(0)} \oplus sd_3$;

for row 1:

$M_1 = 2 * sd_1$;

$t_1^{(1)} = sd_0 \oplus kd_1$;

$t_2^{(1)} = t_1^{(1)} \oplus M_1$;

$t_3^{(1)} = t_2^{(1)} \oplus sd_2$;

$t_4^{(1)} = t_3^{(1)} \oplus M_2$; and new_$sd_1 = t_4^{(1)} \oplus sd_3$;

for row 2:

$M_2 = 2 * sd_2$;

$t_1^{(2)} = kd_2 \oplus sd_0$;

$t_2^{(2)} = t_1^{(2)} \oplus sd_1$;

$t_3^{(2)} = t_2^{(2)} \oplus sd_3$;

$t_4^{(2)} = t_3^{(2)} \oplus M_3$; and new_$sd_2 = t_4^{(0)} \oplus M_2$; and for row 3:

$M_3 = 2 * sd_3$;

$t_1^{(3)} = sd_0 \oplus sd_1$;

$t_2^{(3)} = t_1^{(3)} \oplus M_0$;

$t_3^{(3)} = t_2^{(3)} \oplus sd_2$;

$t_4^{(3)} = t_3^{(3)} \oplus kd_3$; and new_$sd_3 = t_4^{(0)} \oplus M_3$, wherein $M_x$ and $t_x^{(y)}$ all represent temporary-data registers of the plurality of data registers for storing temporary values.

15. The processor of claim 14, wherein multiplications by 2 are performed using one-bit left-shifts.

16. The processor of claim 3, wherein the processor is adapted to perform the byte-substitution and row-shifting transformation for a round over 22 clock cycles by performing:
in the first clock cycle: E2 and C1;
in the second clock cycle: E3, C2, and U1;
in the third clock cycle: E4, C3, and U2;
in the fourth clock cycle: E5, C4, and U3;
in the fifth clock cycle: E6, C5, and U4;
in the sixth clock cycle: E7, C6, U5, and R1;
in the seventh clock cycle: E8, C7, I1, U6, and R2;
in the eighth clock cycle: E9, C8, I2, U7, and R3;
in the ninth clock cycle: E10, C9, I3, U8, and R4;
in the tenth clock cycle: E11, C10, I4, U9, and R5;
in the eleventh clock cycle: E12, C11, I5, U10, and R6;
in the twelfth clock cycle: E13, C12, I6, U11, and R7;
in the thirteenth clock cycle: E14, C13, I7, U12, and R8;
in the fourteenth clock cycle: E15, C14, I8, U13, and R9;
in the fifteenth clock cycle: E16, C15, I9, U14, and R10;
in the sixteenth clock cycle: C16, I10, U15, and R11;
in the seventeenth clock cycle: I11, U16, and R12;
in the eighteenth clock cycle: I12 and R13;
in the nineteenth clock cycle: I13 and R14;
in the twentieth clock cycle: I14 and R15;
in the twenty-first clock cycle: I15 and R16; and
in the twenty-second clock cycle: E1 and I16, wherein:
b=c=4;
m is an non-negative integer;
1≦m≦16;
the processor comprises an address-generation unit (AGU);
Em represents an ALU-performed extraction operation for element m of the state;
Cm represents an ALU-performed calculation operation for that element m of the state;
Um represents an AGU-performed uploading operation for that element m of the state;
Rm represents an AGU-performed reading operation for that element m of the state;
Im represents an ALU-performed insertion operation for that element m of the state; and
the E1 operation in the twenty-second clock cycle is performed for the subsequent round.

17. The processor of claim 3, wherein the processor is adapted to perform the byte-substitution and row-shifting transformation for a round over 22 clock cycles by performing:
in the first clock cycle: E3, C2 and U1;
in the second clock cycle: E4, C3, E5, RK2, and RK1;
in the third clock cycle: E6, C4, U2, and RK3;
in the fourth clock cycle: E7, C5, U3, and RK4;
in the fifth clock cycle: C1, C6, CK1, and U4;

in the sixth clock cycle: E8, C7, CK2, E10, U5, and R1+I1;
in the seventh clock cycle: E9, C8, U6, and R2;
in the eighth clock cycle: E12, C9, I2, U7, and R3;
in the ninth clock cycle: E11, C10, CK3, I3, U8, and R4;
in the tenth clock cycle: E16, C11, CK4, I4, U9, and R5;
in the eleventh clock cycle: E13, C12, CK5, I5, U10, R6;
in the twelfth clock cycle: E14, C13, E15, I6, U11, and R7;
in the thirteenth clock cycle: C14, I7, U12, and R8;
in the fourteenth clock cycle: C15, I8, U13, and R9+I9;
in the fifteenth clock cycle: C16, U14, and R10;
in the sixteenth clock cycle: I10, U15, and R11;
in the seventeenth clock cycle: I11, U16, and R12;
in the eighteenth clock cycle: I12, RK5, and R13;
in the nineteenth clock cycle: I13 and R14;
in the twentieth clock cycle: CK6, I14, and R15;
in the twenty-first clock cycle: E1, I15, and R16; and
in the twenty-second clock cycle: E2 and I16, wherein:
the processor comprises an address-generation unit (AGU);
b=c=4;
m and h are non-negative integers;
$1 \leq m \leq 16$;
Em represents an ALU-performed extraction operation for element m of the state;
Cm represents an ALU-performed calculation operation for that element m of the state;
Um represents an AGU-performed uploading operation for that element m of the state;
Rm represents an AGU-performed reading operation for that element m of the state;
Im represents an ALU-performed insertion operation for that element m of the state;
Rm+Im represents an AGU-performed combined reading and insertion operation for that element m of the state;
RKh represents an AGU-performed read-key operation for reading key values from an expanded key schedule;
CKh represents an ALU-performed combine-copy operation for combining key values from the expanded key schedule;
the E1 operation in the twenty-first clock cycle and the E2 operation in the twenty-second clock cycle are performed for the subsequent round.

18. A method for a cryptography processor comprising one or more arithmetic logic units (ALUs) and a plurality of data registers, the method comprising:
receiving an a-bit-long block of data, wherein the block of data is organized as a/n n-bit words;
storing the a/n n-bit words as a state in the data registers, wherein the state is a matrix having b>1 rows and c>1 columns of p-bit state elements, wherein:
a, n, p, b, c, and a/n are positive integers;
$p \geq 9$;
p>n;
a/n>1;
each n-bit word of data is stored in a corresponding p-bit state element; and
b*c*n=a; and
performing a column-mixing transformation on the state using the one or more ALUs, wherein the column-mixing transformation involves generating finite-field products using bit-shifting and XOR operations.

19. The method of claim 18, wherein:
a is 128;
n is 8;
a/n is 16;
b is 4; and
c is 4.

20. The method of claim 18, wherein:
the processor is processes the data block in a manner compatible with the Advanced Encryption Standard (AES); and
the processing comprises transforming the state over a plurality of rounds comprising an element-substitution transformation, a row-shifting transformation, a column-mixing transformation, and a round-key-adding transformation.

21. A cryptography processor comprising:
one or more arithmetic logic units (ALUs); and
a plurality of data registers, wherein the processor is adapted to:
receive an a-bit-long block of data, wherein the block of data is organized as a/n n-bit words;
store the a/n n-bit words as a state in the data registers, wherein the state is a matrix having b>1 rows and c>1 columns of p-bit state elements, wherein:
a, n, p, b, c, and a/n are positive integers;
p>n;
a/n>1;
each n-bit word of data is stored in a corresponding p-bit state element; and
b*c*n=a;
perform a column-mixing transformation on the state using the one or more ALUs, wherein the column-mixing transformation involves generating finite-field products using bit-shifting and XOR operations; and
process the data block in a manner compatible with the Advanced Encryption Standard (AES), wherein:
the processing comprises transforming the state over a plurality of rounds comprising an element-substitution transformation, a row-shifting transformation, a column-mixing transformation, and a round-key-adding transformation
the element-substitution transformation, ModSubBytes(k), is performed on an element k of the state, where k is a decimal representation of the value of the element, such that $$ModSubBytes(k) = \begin{cases} SubBytes(k) & \text{for } 0 \leq k \leq 255 \\ SubBytes(k \oplus 283) & \text{for } 256 \leq k \leq 511; \end{cases}$$

SubBytes(k) represents the AES SubBytes( ) transformation for k; and
$\oplus$ is an XOR operator.

22. The processor of claim 21, wherein:
the processor is adapted to perform a ModSubBytesShiftRows( ) transformation, which combines the row-shifting and element-substitution transformations, on elements of the state;

ModSubBytesShiftRows($s_{i,j}$)=ModSubBytes($s_{i,j+i(mod\ 4)}$);

$s_{i,j}$ represents the value of the state element at row i and column j; and
mod represents modulo reduction.

23. A cryptography processor comprising:
one or more arithmetic logic units (ALUs); and
a plurality of data registers, wherein the processor is adapted to:

receive an a-bit-long block of data, wherein the block of data is organized as a/n n-bit words;

store the a/n n-bit words as a state in the data registers, wherein the state is a matrix having b>1 rows and c>1 columns of p-bit state elements, wherein:
a, n, p, b, c, and a/n are positive integers;
p>n;
a/n>1;
each n-bit word of data is stored in a corresponding p-bit state element; and
b*c*n=a;

perform a column-mixing transformation on the state using the one or more ALUs, wherein the column-mixing transformation involves generating finite-field products using bit-shifting and XOR operations; and process the data block in a manner compatible with the Advanced Encryption Standard (AES), wherein:
the processing comprises transforming the state over a plurality of rounds comprising an element-substitution transformation, a row-shifting transformation, a column-mixing transformation, and a round-key-adding transformation; and
the row-shifting transformation ModShiftRows( ) circularly shifts each row of the state by d*p bits, wherein d is a non-negative integer.

* * * * *

UNITED STATES PATENT AND TRADEMARK OFFICE
CERTIFICATE OF CORRECTION

PATENT NO. : 8,452,006 B2  Page 1 of 1
APPLICATION NO. : 12/900827
DATED : May 28, 2013
INVENTOR(S) : Dmitriv Vladimirovich Alekseev et al.

It is certified that error appears in the above-identified patent and that said Letters Patent is hereby corrected as shown below:

In the Claims

In column 17, line 68, replace "vectode[e . . . f]" with --*vector*[$e .. f$]--.

In column 18, line 31, replace "new⁻ key" with --new_key--.

Signed and Sealed this
Twenty-fourth Day of December, 2013

Margaret A. Focarino
*Commissioner for Patents of the United States Patent and Trademark Office*